United States Patent
Nadkar

(10) Patent No.: US 9,876,594 B1
(45) Date of Patent: Jan. 23, 2018

(54) ACCESSING INFOTAINMENT SYSTEM USING NON-PAIRED DEVICES

(71) Applicant: Ford Global Technologies, LLC, Dearborn, MI (US)

(72) Inventor: Ashish Nadkar, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/208,508

(22) Filed: Jul. 12, 2016

(51) Int. Cl.
| | |
|---|---|
| *H04W 12/06* | (2009.01) |
| *H04W 84/12* | (2009.01) |
| *H04H 20/62* | (2008.01) |
| *H04L 29/06* | (2006.01) |
| *H04W 76/02* | (2009.01) |
| *G08C 17/02* | (2006.01) |
| *H04W 4/08* | (2009.01) |

(Continued)

(52) U.S. Cl.
CPC ............. *H04H 20/62* (2013.01); *G08C 17/02* (2013.01); *H04L 63/083* (2013.01); *H04W 4/08* (2013.01); *H04W 12/06* (2013.01); *H04W 76/023* (2013.01); *H04W 84/12* (2013.01); *H04W 88/005* (2013.01); *G08C 2201/93* (2013.01); *H04W 84/005* (2013.01)

(58) Field of Classification Search
CPC ....... H04W 4/00; H04W 4/001; H04W 4/005; H04W 4/008; H04W 4/02; H04W 4/046; H04W 4/04; H04W 12/00; H04W 12/06; H04W 12/02; H04W 84/005; H04W 84/12; H04L 63/08; H04L 63/0853; H04L 63/0876; H04L 63/0884
USPC ...................... 455/411, 410, 41.2, 420, 575.9
See application file for complete search history.

(56) References Cited

U.S. PATENT DOCUMENTS

| | | |
|---|---|---|
| 2014/0164559 A1 | 6/2014 | Demeniuk |
| 2015/0222680 A1 | 8/2015 | Grover |
| 2015/0334171 A1 | 11/2015 | Baalu |

(Continued)

FOREIGN PATENT DOCUMENTS

CN          204089944 U          1/2015

OTHER PUBLICATIONS

Samsung and Tata Motors Team Up to Launch InCar Infotainment System, http://www.ibtimes.com/samsungtatamotorsteamlaunchcarinfotainmentsystem1553688, Apr. 5, 2016.

*Primary Examiner* — Philip Sobutka
(74) *Attorney, Agent, or Firm* — David R. Stevens; Stevens Law Group

(57) ABSTRACT

A content projection solution includes a first device paired with an IVI system, a second device, instances of an application running on these devices, and a corresponding application server. The first device registers an application on an IVI. The application notifies the server of the registration. The IVI may broadcast IDs of registered applications over BLE. An application on the second device searches for a target to present/control application content on the IVI via the first device, either through linking of application users logged into its server from first and second devices or by detecting presence of its ID in a BLE broadcast. In response to selection of a target, the IVI requests authorization. If authorized, control inputs received on the second device are transmitted to application server, which processes them and provides content or instructions to the first device, which invokes presentation or execution thereof by the IVI.

18 Claims, 7 Drawing Sheets

(51) Int. Cl.
*H04W 88/00* (2009.01)
*H04W 84/00* (2009.01)

(56) References Cited

U.S. PATENT DOCUMENTS

2015/0373479 A1* 12/2015 Xia .................. H04W 4/005
                                                    455/420
2016/0065646 A1   3/2016 Tonshal
2016/0344730 A1* 11/2016 Holz .................. H04L 63/0876

* cited by examiner

ACCESSING INFOTAINMENT SYSTEM USING NON-PAIRED DEVICES

FIELD OF THE INVENTION

This invention relates to accessing functions of a mobile application using an in-vehicle infotainment (IVI) system.

BACKGROUND OF THE INVENTION

Modern vehicles include sophisticated infotainment systems that typically include a large touch screen on which sophisticated interfaces may be displayed along with content. The functionality of an IVI system is often further extended by enabling interaction with applications executing on a mobile device. Following pairing with a device, applications on the mobile device may be controlled through the IVI system and present content (audio, video, etc.) through the IVI system. Examples of this type of system include APPLINK from FORD, CARPLAY from APPLE, ANDROID AUTO from GOOGLE.

The systems and methods disclosed herein provide an improved approach for extending the functionality of an IVI system using mobile devices.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
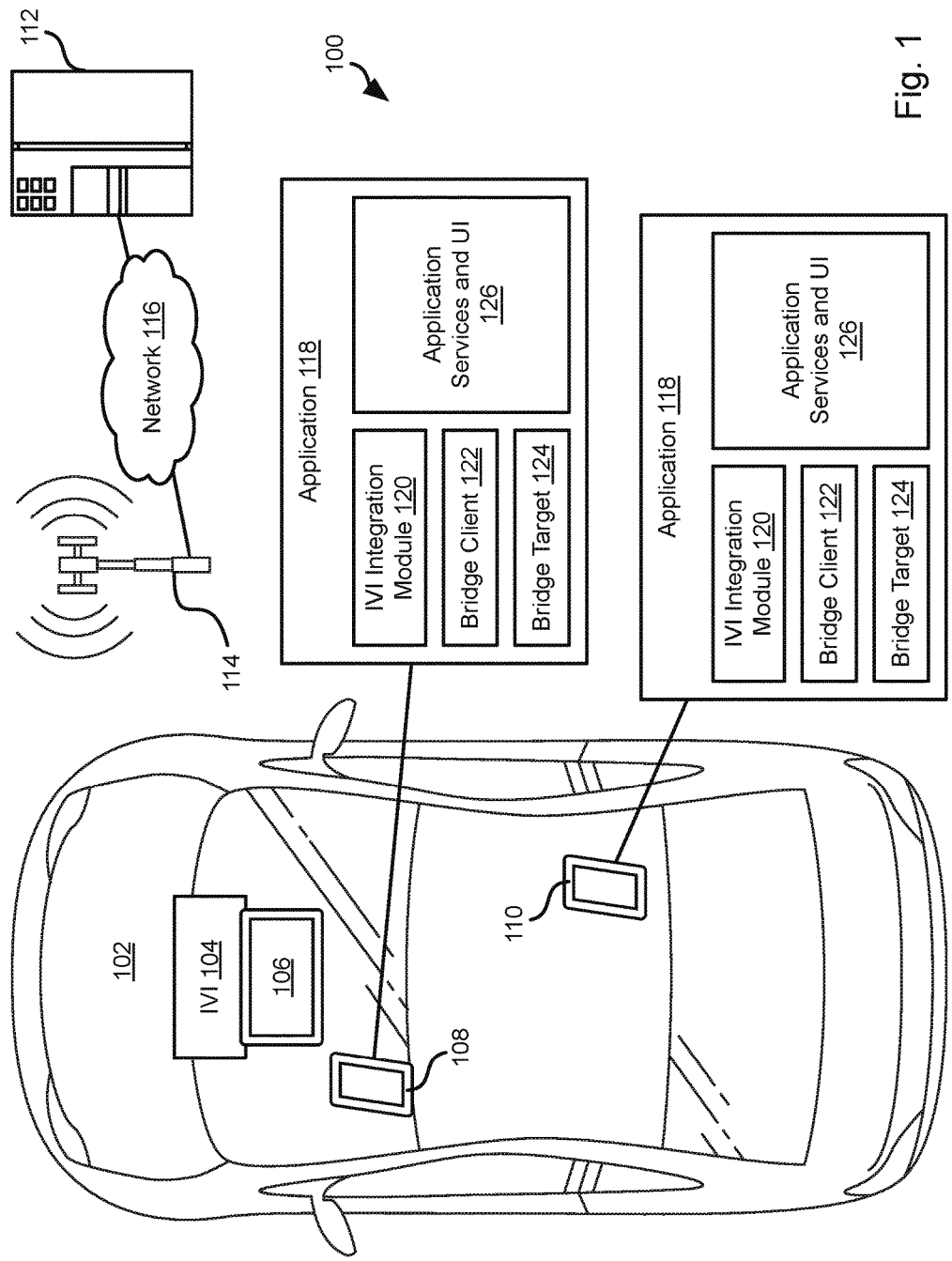
FIG. 1 is a schematic block diagram of an environment in which to implement systems and methods in accordance with an embodiment of the present invention.

Referring to FIG. 1, an environment 100 in which methods described herein may be implemented may include a vehicle 102 hosting an in-vehicle infotainment (IVI) system 104. The IVI system 104 may have some or all of the attributes of a general purpose computing device. The infotainment system 104 may include a screen 106 that may be embodied as a touch screen.

As known in the art, the IVI system 104 may be coupled to speakers or other audio outputs and be programmed to provide an interface for selecting audio content to be played back using the speakers or other audio outputs. Audio content may be selected from one or more sources of audio content coupled to the IVI system 104, such as radio, compact disc (CD) player, and the like. The IVI system 104 may further display video content on the screen 106 or one or more other screens disposed within the vehicle 102. The IVI system 104 may be display video content selected from one or more sources of video content, such as a DVD player, paired mobile device, or other source of video data.

The infotainment system 104 may further be coupled to one or more systems of the vehicle 102 itself and enable the display of status information for the vehicle 102 and receiving inputs modifying the operation of one or more systems of the vehicle 102 itself, such a climate control, engine operating parameters, and the like.

A vehicle 102 typically conveys a driver and one or more passengers. The driver and one or more passengers may operate two or more mobile devices 108, 110 in the embodiments disclosed herein. For purposes of this disclosure, mobile device 108 is paired with the IVI system 104, such as through BLUETOOTH, universal serial bus (USB), or some other wired or wireless connection, whereas mobile device 110 is not paired with the IVI system 104. In order to clearly explain the different the roles of the devices 108, 110, the mobile device 108 is referred to as the driver device 108 and the mobile device 110 is referred to as the passenger device 110. However, in some instances the paired mobile device 110 may belong to a passenger and the paired device 108 may belong to another passenger or the driver without altering the functionality described herein.

The mobile devices 108, 110 may interact with an application server 112. Specifically, an application server 112 may interact with applications executing on the mobile devices 108, 110. For example, the application server 112 may be a provider of audio content, such as SPOTIFY, PANDORA, or the like. The application server 112 may also be a provider of video content, such as YOUTUBE, NETFLIX, or the like. The application server 112 may be a provider of navigation content, such as WAZE or GOGGLE MAPS.

The mobile devices 108, 110 may interact with the application server 112 by way of a cellular communication antenna 114 over a wireless connection. The cellular communication antenna 114 may be coupled to the application server 112 by way of a network 116 that may include one or more other wired or wireless connections. The network 116 may include a local area network (LAN), wide area network (WAN), the Internet, or any other type of network.

The mobile devices 108, 110 execute an application 118 programmed to interact with the server system 112 that includes the illustrated components 120-126. For example, the application 118 may include an IVI integration module 120. The IVI integration module 120 is programmed to transmit content to the IVI 104 for display on the screen 104 and/or playing through speakers. The IVI integration module 120 may be further programmed to receive interactions from the IVI 104 and process them to control operation of the application 118.

The application 118 may further include a bridge client 122 and a bridge target 124. The bridge client 122 implements functionality enabling the application 118 to control an IVI system 104 paired with another device. For example, the passenger device 110 may access the IVI 104 through the driver device 108 using the bridge client 122 as described below. The bridge target 124 implements functionality enabling the application executing on a paired device to facilitate control of the IVI system 104 by a non-paired device. In the example of FIG. 1, the driver device 108 uses the functionality of the bridge target 124. The operation of the bridge client 122 and bridge target 124 may be understood with respect to the discussion of FIGS. 4A through 5B below.

The application 118 may further execute application services and user interface (UI) functions 126. These may include any application functions known in the art including rendering user interface elements on a screen, receiving inputs to user interface elements, processing the inputs according to programmed functionality, retrieving content from the application server 112, rendering the content, providing data to the application server 112, and any other application functionality known in the art.

The IVI integration module 120 may couple outputs as generated by the application services and user interface 126 to the screen 106 and provide inputs to the IVI system 104 to the application services and UI 126. The inputs received by way of the IVI system 104 may be processed in the same manner as corresponding inputs provided through the device 108, 110 executing the application 118. Likewise, the content provided to the IVI system for display on the screen 106 may be generated in the same manner as for content displayed on the screen of the device executing the application 108, 110.

Figure 2:
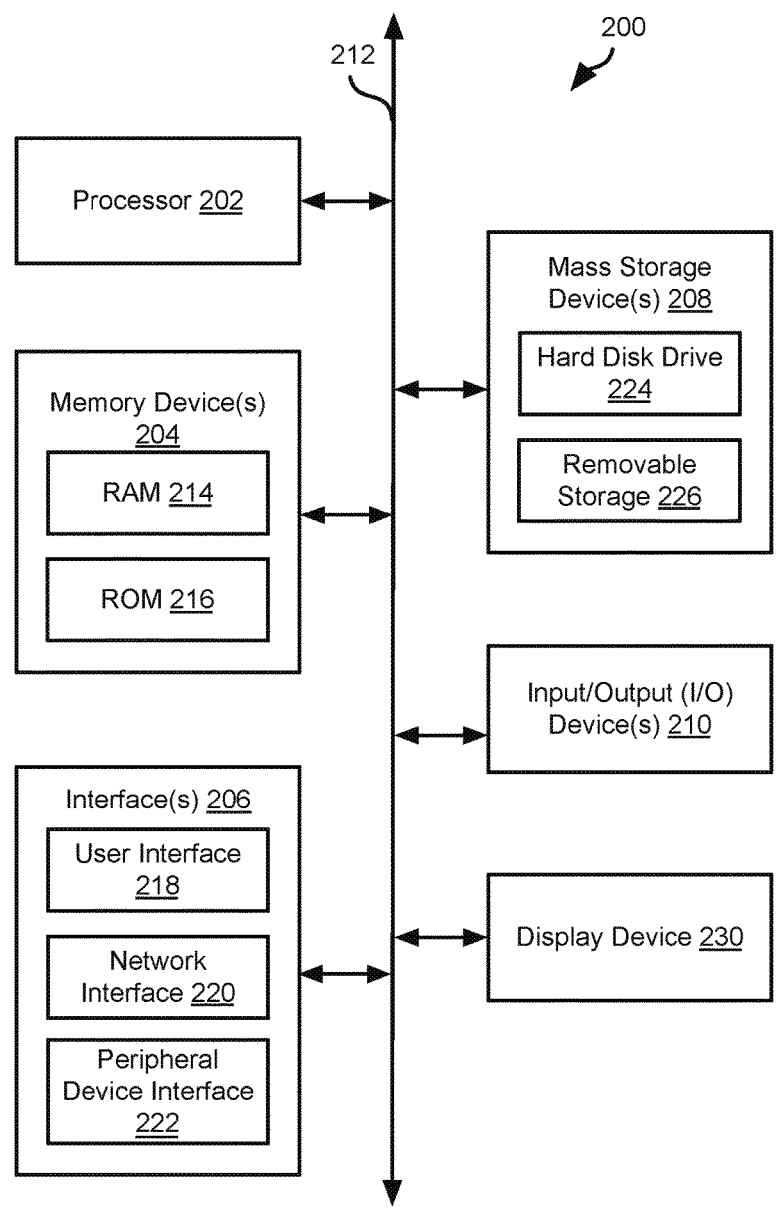
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The IVI system 104, mobile devices 108, 110, and application server 112 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
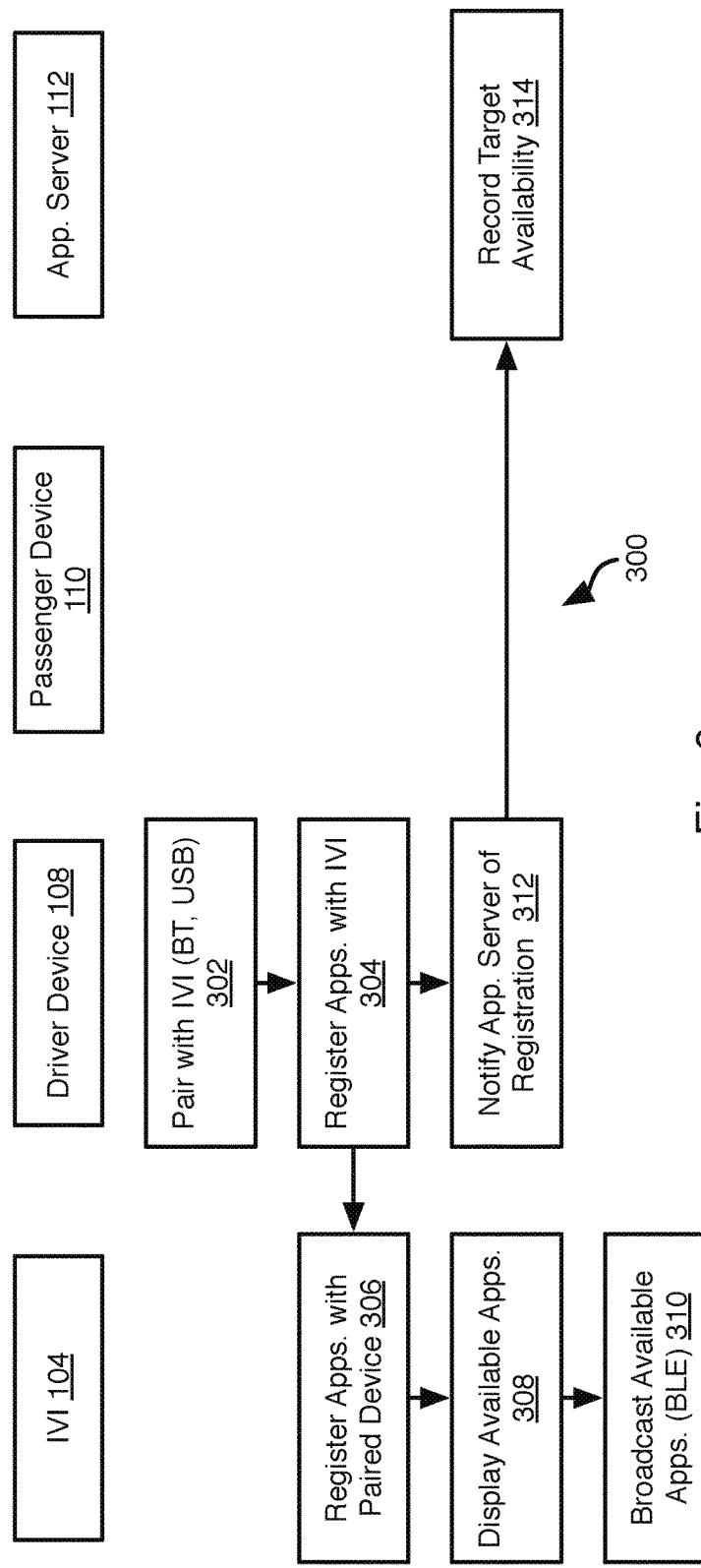
FIG. 3 is a process flow diagram illustrating a method for registering applications of a mobile device with an IVI system.

Referring to FIG. 3, the illustrated method 300 may be executed within the environment 100 in order to provide access to the IVI system 104 by applications 118 executing on a driver device 108 and further to inform the application server 112 of the pairing of the driver device 108 with the IVI system 104.

The method 300 may include pairing 302 the driver device 108 with the IVI system 104. This may include paring the devices according to BLUETOOTH protocol, coupling the driver device 108 to the IVI system 104 by means of a cable, such as a universal serial bus (USB) cable, or any other pairing process known in the art.

In response to the pairing, the driver device 108 connects to the IVI system 104 and registers 304 one or more applications with the IVI system 104 over the connection. For example, the driver device 108 may send a data packet or file that includes a listing of applications that are installed on the driver device 108 and that include an IVI integration module 120 such that the controls and presentation of content may be shared with the IVI system 104. The data packet or file may further include graphical icons for display an interface of the IVI system 104 and may include data defining interface elements to be presented on the IVI system 104 for invoking functionality of the applications.

The IVI system 104 receives the data sent at step 304 and registers 306 these applications in association with the driver device 108. For example, the IVI system 104 may store a record that includes the listing of applications and other data sent from the driver device 108. When an application loses communication with an IVI system 104, the application may notify the application server 112, which will then delete the record.

The IVI system 104 may display 308 available applications on the screen 106. For example, in response to a user input requesting display of available mobile applications, a listing of the applications registered at step 306 may be displayed in the form of an array of icons, each icon corresponding to one of the applications.

In some embodiments, the IVI system 104 may further broadcast 310 a listing of registered applications, such as over a protocol such as BLUETOOTH LOW ENERGY (BLE) or other wireless protocol. In some embodiments, step 310 is performed periodically while the driver device 108 is actually connected to the IVI system 104 or is transmitted one or more times in response to the establishment of a connection to the driver device 108.

Some or all of the applications that are registered at step 304 may notify 312 a corresponding application server 112 of the registration. For example, where a SPOTIFY application is registered at step 304, the SPOTIFY application installed on the driver device 108 may notify the application server 112 of the registration. In some embodiments, the notification step 312 is performed by the bridge target 124 of an application 118 that is registered at step 304. Following notification 312, the application may then operate as a target for the passenger device 110 according to the methods disclosed herein.

Upon receiving the notification sent at step 312, the application server 112 records 314 the availability of a target. In particular, the application that transmits the notification 312 may be authenticated with respect to a user account, i.e. a particular user account is logged in to the application server 112 using that instance of the application. Accordingly, the notification of step 312 may reference that user account by including a username and/or authentication information, which may be encrypted for security. Upon receiving the notification 312, the application server 112 may then store a reference to the pairing with the IVI system 104 in that user account.

Figure 4A:
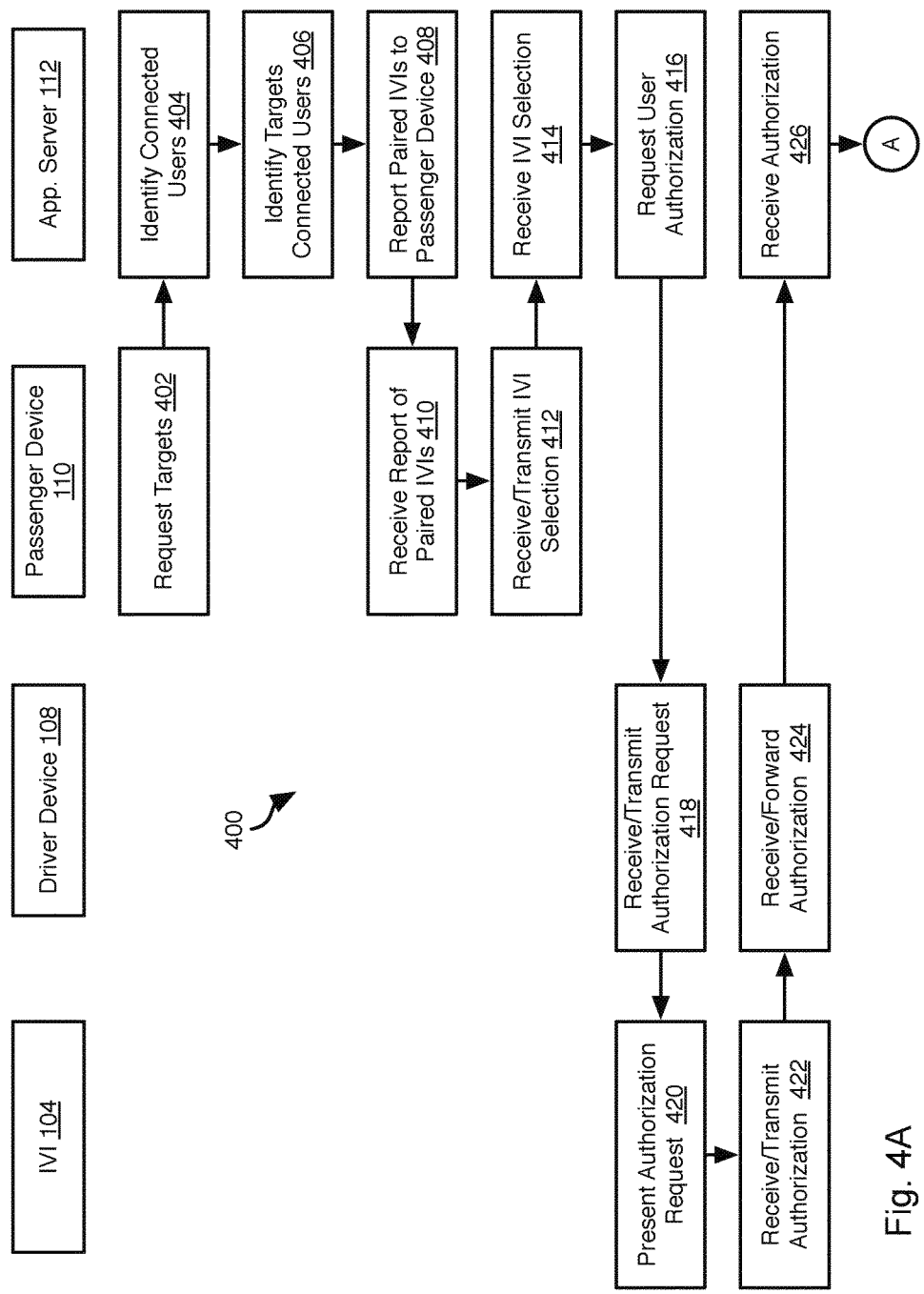
FIGS. 4A and 4B are a process flow diagram illustrating a method for accessing an IVI system using a non-paired device in accordance with an embodiment of the present invention.
Figure 4B:
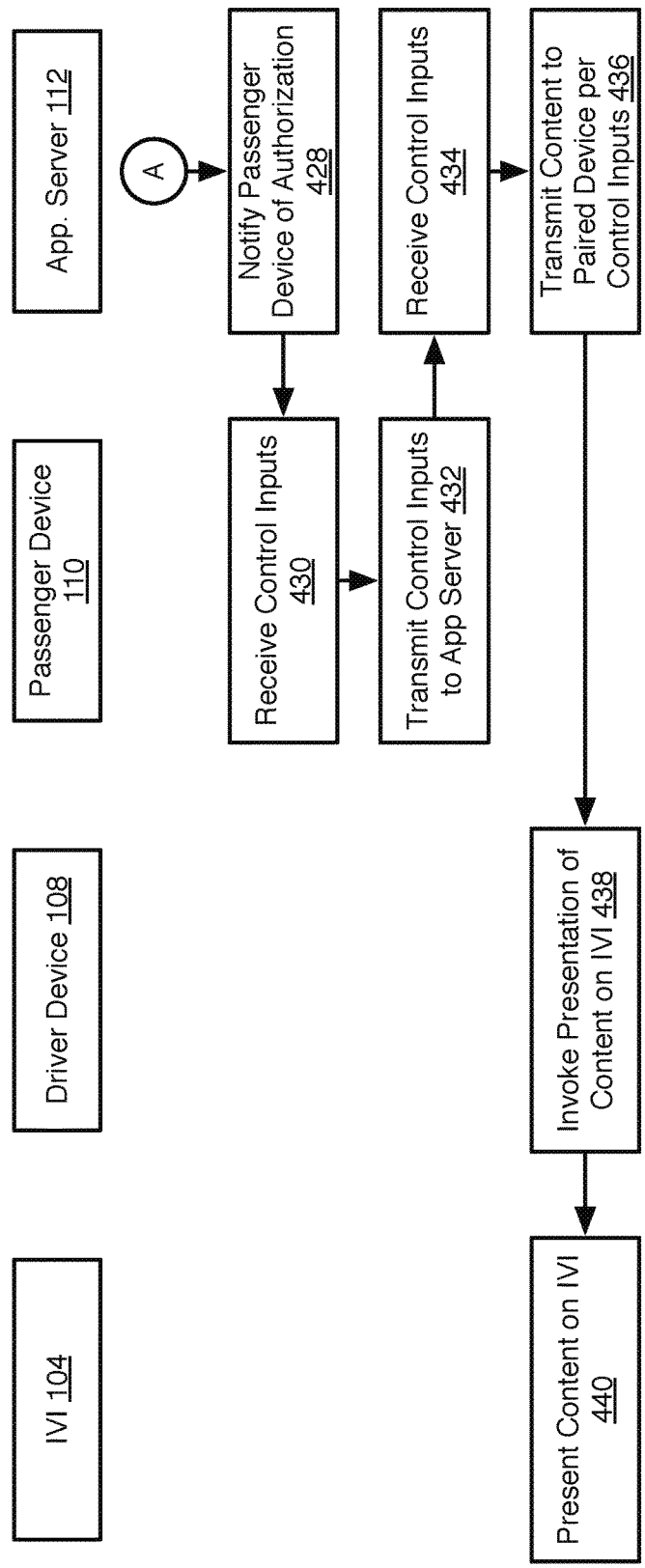

Referring to FIGS. 4A and 4B, the illustrated method 400 may be used to provide access to an IVI system 104 using a passenger device 110 by way of the pairing of the driver device 108 to the IVI system 104.

The method 400 may include requesting 402, by the passenger device 110, a listing of potential targets. The request 402 may be invoked in response to a user navigating to an interface element offering a listing of targets in an application 118 executing on the passenger device 110 ("the passenger application"). Step 402 may be executed by the bridge client 122 of the application 118. As shown, the request 402 may be sent to the application server 112 corresponding to that passenger application. The request 402 may reference the account for which the passenger application is authenticated ("the passenger account") in the form of a username or other credential.

In response to receiving the request of step 402, the application server 112 may identify 404 connected users by identifying one or more other user accounts that are listed as friends or connections in the passenger account.

The application server 112 may then identify 406 among those connected users, whether any targets are associated therewith, i.e. whether a pairing to an IVI system 104 has been recorded 314 in the accounts of those connected users. In some embodiments, targets are connected users for which a pairing to an IVI system 104 has been recorded and that are currently connected to that IVI system 104. In such embodiments, applications 104 may report to the application server 112 both the pairing to the IVI system and the establishment and breaking of connections to the IVI system 104.

If any targets are identified 406, the application server 112 reports 408 these to the passenger application. The passenger application receives 410 this report and presents it to a user in the form of a graphically displayed listing of available targets on a screen of the passenger device 110. The listing may include, for each target, an identifier of the connected users in whose account the target was identified 406.

The user of the passenger device 110 may then select a target ("the selected target") from the listing, e.g. by tapping a representation of the target on a screen of the passenger device 110. In the illustrated example, the selected target represents pairing of the driver device 108 with the IVI system 104 which is recorded in the account ("the driver account") for which the application 118 executing on the driver device 108 ("the driver application") is authenticated.

The passenger application receives 412 this selection and transmits a reference to the selected target to the application server 112, such as using the bridge client 122. The application server 112 receives 414 the target selection and requests 416 authorization to allow the passenger application to access the IVI system 104. This may include transmitting a request for authorization to the driver device 108. The driver device 108 may then receive 418 this request and forward the request to the IVI system 104, which presents 420 the request for authorization on the screen 106. For example, the request presented 420 may include a message stating "Allow [username] to access [application] [yes] [no]", where "username" is the username associated with the passenger account, "application" is the name of the driver and passenger applications, "yes" is a user interface element that will be interpreted as authorization if selected and "no" is a user interface element that will be interpreted as denial of authorization if selected.

If authorization is received 422, this authorization is transmitted to the driver device 108, which receives the authorization and forwards 424 the authorization to the application server 112. The application server 112 receives 426 the authorization.

Referring to FIG. 4B, upon receiving 426 the authorization, the application server 112 may notify 428 the passenger application that authorization has been received. Upon receiving authorization, the passenger application may display on the passenger device 110 a notification that control of the IVI system 104 has been authorized. The passenger application may then receive 430 control inputs and transmit 432 these to the application server. The application server 434 receives the user inputs and identifies content based on the inputs. For example, an input may be selection of a media file (audio, video, image, text), input of a destination address, or other instruction that will invoke display of content. The application server 112 then transmits 436 this content to the driver device 108. Transmitting 436 the content may include transmitting an instruction to present the content on the IVI system 104. The driver device 108 receives the content and invokes 438 presentation of the content on the IVI system. Upon receiving this instruction, the IVI system 104 presents the content. For example, where the content is an audio file, the IVI system 104 will invoke playback of the audio file using speakers coupled to the IVI system 104. Where the content is an image or video file, the IVI system may present 440 the content by displaying it on the screen 106. Where the control input is specification of a destination address, the content may be directions to the destination address. Accordingly, the driver device 108 may invoke display of turn-by-turn directions to the destination address or invoke generation of turn-by-turn directions by a navigation module hosted by the IVI system 104.

Various modifications of the methods 400 of FIGS. 4A and 4B may be performed. For example, in addition to causing the presentation of content by the IVI system 104, the control inputs may include inputs that control the operation of the IVI system 104, such as adjusting the volume, invoking navigation functions, adjusting vehicle control parameters (e.g. climate control functions), or the like.

In another alternative, rather than granting control of the IVI system 104 within the context of the passenger account, the passenger device 110 may be granted access to control the IVI system 104 within the context of the driver account. In such embodiments, step 428 may include both notifying the passenger of authorization and transmitting an interface to the driver account, i.e. an interface that will have content and functionality defined according to preferences and usage of the driver account rather than the passenger account. In such embodiments, control inputs 430 are also processed by the application server 112 in the context of the driver account at step 436.

Figure 5A:
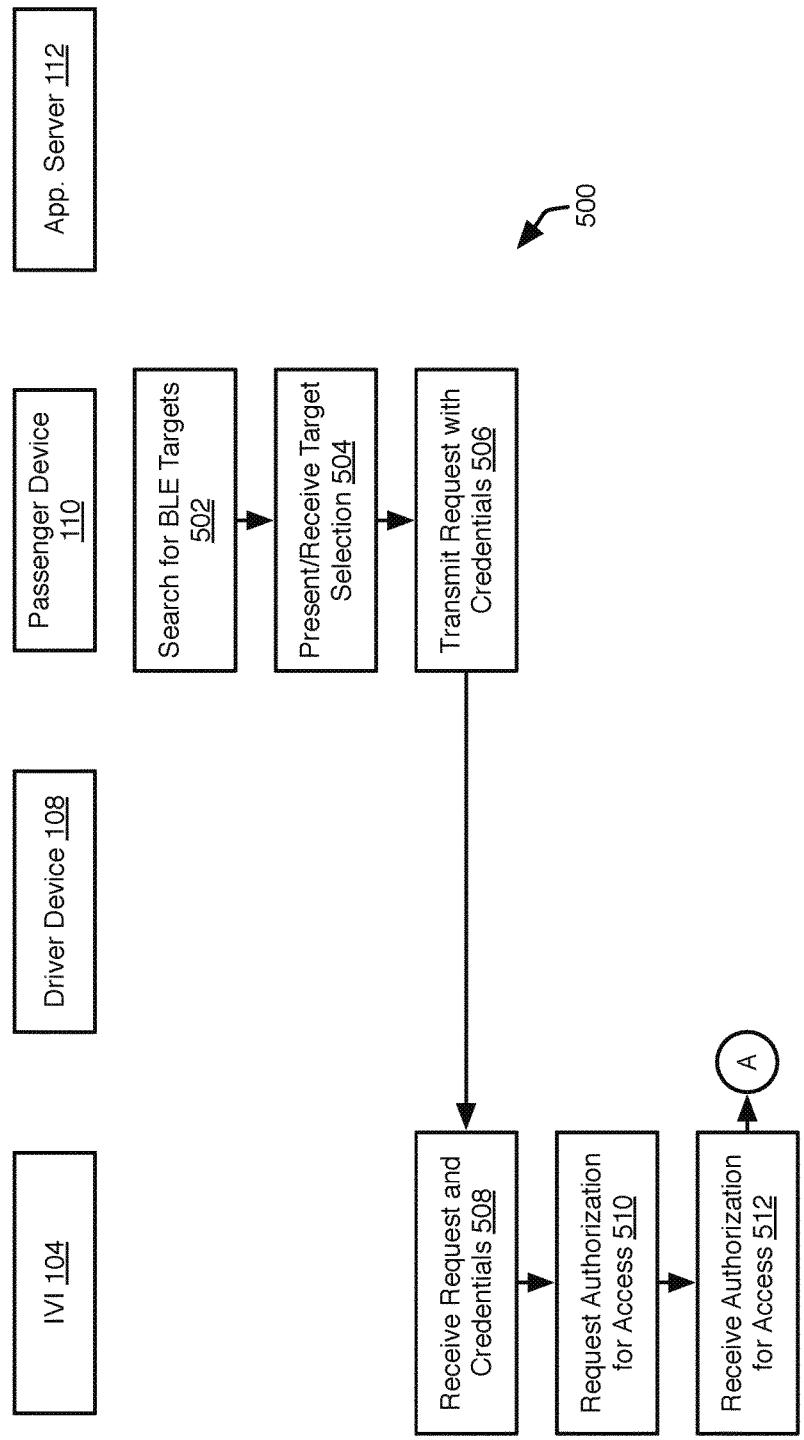
FIGS. 5A and 5B are schematic diagrams of an alternative method for accessing an IVI system using a non-paired device in accordance with an embodiment of the present invention.
Figure 5B:
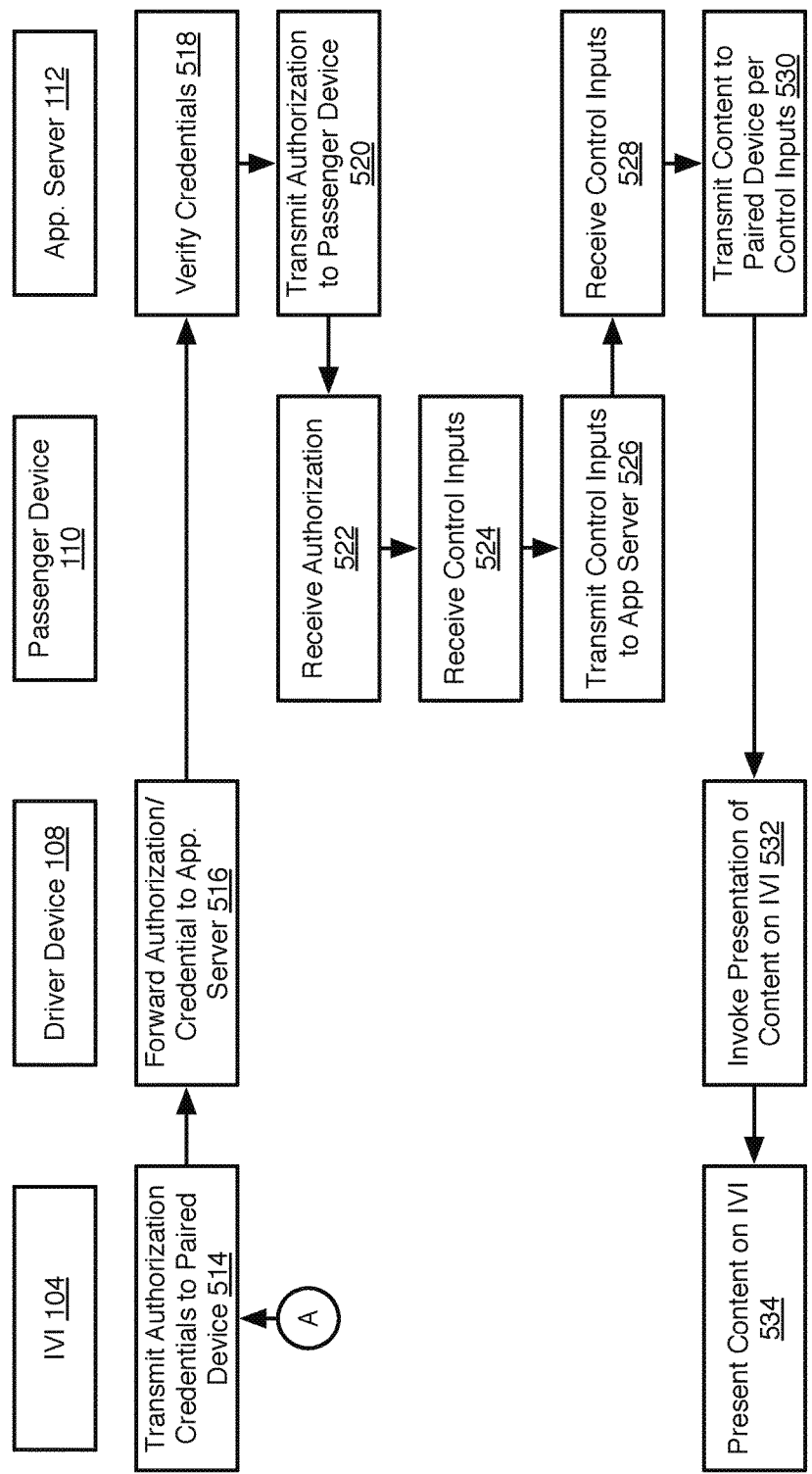

FIGS. 5A and 5B illustrate an alternative method 500 for controlling an IVI system using a non-paired device. The method 500 may be preceded by execution of the method 300 with respect to the driver device 108.

The method 500 may include searching 502, by the passenger device 110, for BLE targets being broadcast by an IVI system 104 within range of the passenger device 110. As noted above, following registration 306 of applications from a paired device, the IVI system 104 may broadcast 310 a listing of available applications. Accordingly, the passenger device 110 may monitor for such broadcasts at step 502.

After receiving such a broadcast, the passenger application may present a representation of the connection between the driver application and the IVI system on the passenger device 110, such as by including it as an element in a graphically displayed listing of available targets on a screen of the passenger device 110.

The user of the passenger device 110 may then select 504 a target ("the selected target") from the listing, e.g. by tapping a representation of the target on a screen of the passenger device 110.

In response to receiving 504 the target selection, the passenger device 110 may transmit 506 to the IVI system 104 a request to access the selected target application using the IVI system 104. For example, the bridge client 122 of the selected target application ("the passenger application") may transmit a username and password, preferably encrypted, to the IVI system for the user account for which the passenger application is authenticated ("the passenger account"). The passenger application may transmit some other credential that is sufficient to authenticate an application with the application server 112 with respect to the passenger account.

Upon receiving 508 the request and the credentials, the IVI system 104 requests 510 authorization for the passenger device 104 to access the IVI system 104 using the passenger application and authorization may then be received 512 or denied. Steps 510 and 512 may be performed in the same manner as for steps 420 and 422 of the method 400.

Referring to FIG. 5B, If authorization is received at step 512, notification of authorization may then be transmitted 514 to the driver device 108 along with the credential received at step 508. The driver application receives the authorization and credential and forwards 516 them to the application server 112.

The application server 112 verifies 518 the credentials, i.e. verifies that the credentials correspond to the passenger account using any authentication technique known in the art. If the credentials are determined at step 518 to be correct for the passenger account, then the application server 112 transmits 520 authorization to the passenger device to control the presentation of content on the IVI system 104.

The passenger application, i.e. the client bridge 122, receives 522 this authorization and may produce an output on the screen of the passenger device 110 that notifies the user that access to the IVI system 104 has been granted. The passenger application may then receive 524 control inputs and transmit 526 the control inputs to the application server 112. The application server 112 receives 528 the control inputs and, in response, identifies content according to the control inputs in the context of the passenger account and transmits 530 the content to the driver device 108. Transmitting 530 the content may include transmitting an instruction to the driver device 108 to present the content on the IVI system 104.

The driver application receives the content and invokes 532 presentation of the content on the IVI system 104. As noted above with respect to the method 400, control inputs may be selection of a media file (audio, video, or image) such that the content that is transmitted 530 and presented 534 is the media file. As also noted above, a control input may be a specification of a destination address and the content transmitted 530 and presented 534 may include turn-by-turn directions to the destination address.

Various modifications of the method 500 of FIGS. 5A and 5B may be performed. For example, in addition to causing the presentation of content by the IVI system 104, the control inputs may include inputs that control the operation of the IVI system 104, such as adjusting the volume, invoking navigation functions, adjusting vehicle control parameters (e.g. climate control functions), or the like.

In another alternative, rather than granting control of the IVI system 104 within the context of the passenger account, the passenger device 110 may be granted access to control the IVI system 104 within the context of the driver account. In such embodiments, the step of verifying 518 the credential may also be omitted inasmuch as the driver application will already be authenticated with the application server. Likewise, rather than transmitting 506 credentials at step 506, a username alone may be sent and processed in place of the credential. In such embodiments, step 520 may include both notifying the passenger of authorization and transmitting an interface to the driver account, i.e. an interface that will have content and functionality defined according to preferences and usage of the driver account rather than the passenger account. In such embodiments, control inputs received at step 528 are also processed by the application server 112 in the context of the driver account at step 530.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s). At least some embodiments of the disclosure have been directed to computer program products comprising such logic (e.g., in the form of software) stored on any computer useable medium. Such software, when executed in one or more data processing devices, causes a device to operate as described herein.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method for content delivery comprising, by a server system:
   receiving a notification of pairing of an in-vehicle infotainment (IVI) system with a first device according to a wireless communication protocol;
   receiving a control input from a second device, the control input being an instruction to present content;
   in response to the control input—
      retrieving the content corresponding to the control input; and
      transmitting the content to the first device with an instruction to the first device to cause the IVI system to present the content;
   wherein the first device has installed thereon a first mobile client application that is authenticated with the server system for a first user account, the method further comprising:
      identifying by the server system, a second user account that is linked to the first user account in an account database, the second device executing a second mobile client application that is authenticated with the server system for the second user account; and
      notifying, by the server system, the second device of the pairing of the IVI system with the first device in response to determining that the second user account is linked to the first user account in the account database.

2. The method of claim 1, further comprising:
   receiving, by the server system, a first request from the second mobile client to access the IVI system through the first mobile client;
   in response to the first request, transmitting, by the server system, a second request for authorization to the first device; and
   receiving, by the server system, an authorization message from the first device;
   wherein transmitting the instruction to the first device is performed only in response to receiving the authorization message from the first device.

3. The method of claim 1, wherein the content is at least one of audio content, video content, and navigation information.

4. A method for content delivery comprising, by a server system:
   receiving a notification of pairing of an in-vehicle infotainment (IVI) system with a first device according to a wireless communication protocol;
   receiving a control input from a second device, the control input being an instruction to present content;
   in response to the control input—
      retrieving the content corresponding to the control input; and
      transmitting the content to the first device with an instruction to the first device to cause the IVI system to present the content
   receiving, by the server system, from the first device, a credential forwarded by the first device from the second device; and
   verifying, by the server system, the credential; and
   wherein transmitting the instruction to the first device to cause the IVI system to present the content is permitted only after receiving the credential from the first device and verifying the credential.

5. The method of claim 4, wherein the first device has a first mobile application installed thereon that is authenticated with the server system for a first user account; and
   wherein the credential includes login information for a second user account, the second device hosting a second mobile application that is authenticated for the second user account.

6. A method for content delivery comprising, by a server system:
   receiving a notification of pairing of an in-vehicle infotainment (IVI) system with a first device according to a wireless communication protocol;
   receiving a control input from a second device, the control input being an instruction to present content,
   in response to the control input—
      retrieving the content corresponding to the control input; and
      transmitting the content to the first device with an instruction to the first device to cause the IVI system to present the content;
   wherein the first device has installed thereon a first mobile client application that is authenticated with the server system for a first user account;
   wherein the second device has installed thereon a second mobile client application that is authenticated with the server system for a second user account;
   wherein the method further comprises processing, by the server system, the input from the second device in context of the second user account to select the content.

7. A method for content delivery comprising, by a server system:
   receiving a notification of pairing of an in-vehicle infotainment (IVI) system with a first device according to a wireless communication protocol;

receiving a control input from a second device, the control input being an instruction to present content;

in response to the control input—
retrieving the content corresponding to the control input; and
transmitting the content to the first device with an instruction to the first device to cause the IVI system to present the content;

wherein the first device has installed thereon a first mobile client application that is authenticated with the server system for a first user account;

wherein the second device has installed thereon a second mobile client application that is authenticated with the server system for a second user account;

wherein the method further comprises processing, by the server system, the input from the second device in context of the first user account to select the content.

8. The method of claim 7, further comprising:
generating, by the server system, an interface according to data associated with the first user account; and
transmitting, by the server system, the interface to the second device;
wherein the control input comprises an interaction with the interface.

9. A system comprising one or more processing devices and one or more non-transitory memory devices coupled to the one or more memory devices, the one or more memory devices storing executable code effective to cause the one or more processing devices to:
pair with a first device;
receive, from the first device, an instruction to request authorization for a second device to control content provided to the system from a mobile application installed on the first device;
receive an input;
if the input indicates granting of authorization, transmit a response to the first device indicating granting of authorization;
receive content from the first device in response to control inputs received on the second device; and
present the content on an output device coupled to the system;
wherein the executable code is further effective to cause the one or more processors to:
receive, from the first device, a list of available applications having corresponding interfaces implemented by the system; and
broadcast the list of available applications over a wireless protocol.

10. The system of claim 9, wherein the executable code is further effective to cause the one or more processing devices to pair with the first device over at least one of BLUETOOTH protocol and a universal serial bus (USB) cable.

11. The system of claim 9, wherein the wireless protocol is BLUETOOTH LOW ENERGY (BLE).

12. The system of claim 9, wherein the executable code is further effective to cause the one or more processors to:
receive, from the second device, a first message referencing an application from the list of applications and including authentication information; and
in response to receiving the first message, transmit a second message referencing the application from the list of applications and the authentication information to the first device.

13. The system of claim 9, wherein the executable code is further effective to cause the one or more processors to present the content on the output device coupled to the system by outputting at least one of audio content, video content, and navigation information.

14. A non-transitory computer readable medium storing computer instructions effective to cause a computing device to:
pair with an in-vehicle infotainment (IVI) system according to a wireless communication protocol;
register an application with the IVI system;
notify an application server corresponding to the application of the pairing with the IVI system according to the wireless communication protocol;
receive an input authorizing access to the IVI system through the application by a second computing device;
receive content from the application server in response to inputs received on the second computing device subsequent to receiving the input authorizing access to the IVI through the application by the second computing device; and
transmit the content to the IVI system with an instruction to present the content using an output device coupled to the IVI system.

15. The non-transitory computer readable medium of claim 14, wherein the computer instructions are further effective to:
authenticate the application with the application server with respect to a first user account; and
receive an interface from the application server, the interface defined according to data from a second user account different from the first user account.

16. The non-transitory computer readable medium of claim 14, wherein the computer instructions are further effective to:
receive the input authorizing access to the IVI system through the application by the second computing device by way of an input device of the IVI system.

17. The non-transitory computer readable medium of claim 16, wherein the computer instructions are further effective to:
authenticate the application with the application server;
receive, by the application, from the application a server, a request to permit access to the IVI system through the application by the second computing device; and
transmit, by the application to the IVI system, an instruction to request authorization to permit access to the IVI system through the application by the second device.

18. The non-transitory computer readable medium of claim 14, wherein the content is at least one of audio content, video content, and navigation information.

* * * * *